(12) United States Patent
Merchant

(10) Patent No.: US 11,335,126 B1
(45) Date of Patent: May 17, 2022

(54) USING ARTIFICIAL INTELLIGENCE TO ANALYZE OUTPUT FROM A SECURITY SYSTEM TO DETECT A POTENTIAL CRIME IN PROGRESS

(71) Applicant: Amizen Labs, LLC, Great Neck, NY (US)

(72) Inventor: Shajahan Merchant, Great Neck, NY (US)

(73) Assignee: Amizen Labs, LLC, Great Neck, NY (US)

( * ) Notice: Subject to any disclaimer, the term of this patent is extended or adjusted under 35 U.S.C. 154(b) by 0 days.

(21) Appl. No.: 17/488,262

(22) Filed: Sep. 28, 2021

(51) Int. Cl.
  *G06V 40/20* (2022.01)
  *G06T 5/00* (2006.01)
  *G06V 40/16* (2022.01)

(52) U.S. Cl.
  CPC .............. *G06V 40/23* (2022.01); *G06T 5/002* (2013.01); *G06T 5/003* (2013.01); *G06V 40/174* (2022.01); *G06T 2207/20081* (2013.01); *G06T 2207/30232* (2013.01)

(58) Field of Classification Search
  CPC ........... G06K 9/00342; G06K 9/00302; G06K 9/00221; G06K 9/00241; G06K 9/00248; G06K 9/00268; G06K 9/00275; G06K 9/00281; G06K 9/00288; G06K 9/00295; G06K 9/00308; G06K 9/00315; G06K 2009/00322; G06K 2009/00328; G06K 9/00335; G06K 9/00348; G06K 9/00355; G06K 9/00362; G06K 9/00369; G06K 9/00375; G06K 9/00382; G06K 9/00389; G06K 9/00771; G06T 5/002; G06T 5/003; G06T 2207/20081; G06T 2207/30232; G06T 2207/10004; G06T 2207/10008; G06T 2207/10012; G06T 2207/10016; G06T 2207/10021; G06T 2207/20084; G06N 20/00; G06N 3/082; G06N 3/084; G06N 3/086; G06N 3/088; G06N 5/04; H04N 7/18; H04N 7/181; H04N 7/183; H04N 7/185; H04N 7/188; G06Q 50/265; G08B 13/22; G08B 21/182; G08B 23/00;
  (Continued)

(56) References Cited

U.S. PATENT DOCUMENTS

2018/0272992 A1* 9/2018 Gage ................... G06K 9/00979
2018/0357247 A1* 12/2018 Siminoff ........... G08B 13/19645
2019/0089934 A1* 3/2019 Goulden ........... G08B 13/19656
(Continued)

*Primary Examiner* — Jose L Couso
(74) *Attorney, Agent, or Firm* — Shiv S. Naimpally (57) ABSTRACT

In some aspects, one or more processors may perform an analysis of a processed image using an artificial intelligence module. Based on the analysis, the one or more processors may determine that the processed image includes one or more threats and determine details associated with individual threats of the one or more threats. The one or more processors may determine, based on the details associated with the one or more threats, that a particular threat threshold of a plurality of threat thresholds has been satisfied. The one or more processors may add one or more annotations to the image to create an annotated image that includes the one or more threats and at least a portion of the details associated with individual threats of the one or more threats. The one or more processors may send a notification to one or more designated recipients.

20 Claims, 7 Drawing Sheets

(58) Field of Classification Search
CPC ......... G08B 3/00; G08B 5/00; H04L 63/0209; H04L 63/30; H04L 63/302
See application file for complete search history.

(56) References Cited

U.S. PATENT DOCUMENTS

| | | | |
|---|---|---|---|
| 2020/0117900 A1* | 4/2020 | Deng | H04W 4/02 |
| 2021/0006933 A1* | 1/2021 | Dean | H04W 12/06 |
| 2021/0020022 A1* | 1/2021 | Hutz | G06K 9/00335 |
| 2021/0248822 A1* | 8/2021 | Choi | G06K 9/00362 |
| 2021/0289168 A1* | 9/2021 | Gluckert | G08B 29/186 |
| 2021/0366072 A1* | 11/2021 | Millar | G06F 9/451 |
| 2021/0397848 A1* | 12/2021 | Lee | G06K 9/00744 |

* cited by examiner

USING ARTIFICIAL INTELLIGENCE TO ANALYZE OUTPUT FROM A SECURITY SYSTEM TO DETECT A POTENTIAL CRIME IN PROGRESS

BACKGROUND OF THE INVENTION

Field of the Invention

This invention relates to a system that uses artificial intelligence to analyze one or more images to detect potential threats. If a threat threshold is satisfied, the system may perform one or more actions, including, for example, notifying designated recipient(s).

Description of the Related Art

Various locations, such as convenience stores, jewelers, vehicles, airplanes, and the like, are frequently the victims of crimes, such as robberies. In some cases, people may be shot and either injured or killed as a result, despite cooperating with the perpetrator(s). Often, by the time the authorities (the police, an owner, or the like) have been notified, the perpetrator(s) have left the scene of the crime and must be found and apprehended. Sometimes, even when the perpetrators have been found, the items that were taken (e.g., money, valuable objects, and the like) may not be recovered.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some aspects, one or more processors may perform an analysis of a processed image using an artificial intelligence module. Based on the analysis, the one or more processors may determine that the processed image includes one or more threats and determine details associated with individual threats of the one or more threats. The one or more processors may determine, based on the details associated with the one or more threats, that a particular threat threshold of a plurality of threat thresholds has been satisfied. The one or more processors may add one or more annotations to the image to create an annotated image that includes the one or more threats and at least a portion of the details associated with individual threats of the one or more threats. The one or more processors may send a notification to one or more designated recipient(s).

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

The systems and techniques described herein monitor the output, e.g., the video stream(s), of a security system installed at a business and use artificial intelligence to analyze the images of the video stream(s) to identify threats, determine whether the threats satisfy one or more thresholds, and if the threats satisfy the one or more thresholds, provide a notification to one or more predefined recipients. The notification may include a link that enables the recipient to view at least a portion of the video stream(s). For example, in some cases, the notification may be sent to an owner of a business or to a security company monitoring the business and the owner or an employee of the security company may view at least a portion of the video stream(s) and determine whether to notify the police. In other cases, the notification may be sent directly to the police and the police may view the portion of the video stream(s) and determine whether to send officers to the business, e.g., to apprehend those involved.

The artificial intelligence may perform threat detection using several different techniques. For example, the artificial intelligence may identify at least one weapon being held by a non-employee. As another example, the artificial intelligence may analyze and identify facial expressions of an employee, a non-employee, another person that is present, or any combination thereof to determine whether a threat is present. For example, the artificial intelligence identify fear in the facial expression of a first person (e.g., employee) and determine that a threat is present. As yet another example, the artificial intelligence may analyze the posture of the first person (e.g., employee), a second person (e.g., non-employee), another person that is present, or any combination thereof to determine whether a threat is present. For example, if the first person is holding both arms up in the air, both hands behind their head, both hands behind their back, crouching, lying down, or the like, then the artificial intelligence may determine, based on the first person's posture, that a threat is present. As a further example, artificial intelligence may analyze physical items in the building, whether shelves are partially empty or fully empty, whether a safe is open, whether the safe is partially empty or fully empty, whether there is broken glass, or the like to determine whether a threat is present.

In some cases, the artificial intelligence may look at a hand gesture that the first person is making or a location of one or more of the first person's hands to determine whether a threat is present. For example, the employer may train employees to create a particular hand gesture when a threat is present and the artificial intelligence may be trained to recognize the particular hand gesture. To illustrate, the first person may place their hands up in the air or behind their head and use their fingers and thumbs to create the particular hand gesture. The artificial intelligence may analyze the video streams provided by cameras of the security system to identify the particular hand gesture and determine that a threat is present. As another example, the employer may place a particular sign in a location, such as on the side of a point-of-sale terminal, behind the counter, or the like, that is not easily visible to a non-employee. In some cases, the sign may be machine-readable but not human-readable. The first person may place their hand (or another appendage, such as a forearm, an elbow, or the like) on the particular sign to indicate a threat or the revelation of the sign (e.g., on the bottom of a safe/cash drawer or on a shelf with high value items) may itself may indicate a threat. For example, after money is removed from a safe or a cash drawer or items (e.g., jewelry) are removed from a shelf, a previously covered indicator (e.g., a machine-readable code, such as a quick reference (QR) code) may be exposed. The artificial intelligence may read the indicator and determine that items are missing and determine that a threat is present. The artificial intelligence may determine that the first person has placed their hand on the particular sign for more than a threshold amount of time and determine the presence of a threat.

The output of the security system may include one or more images (e.g., video streams) from multiple cameras or screen shots from display devices. The video cameras may be capable of capturing and transmitting electromagnetic radiation that is not visible to the human eye, such as ultraviolet, infrared, heatmap, and the like. Thus, even if the lights are off, the artificial intelligence may be capable of analyzing the images of the video streams. In some cases, the security system may include additional sensors, such as microphones, motion sensors, and the like. The artificial intelligence may analyze the output of the security system, including images (e.g., in video streams), audio data, motion data, and other types of data to determine the presence of a threat.

In some cases, the output of the security system may be modified prior to being analyzed by the artificial intelligence. For example, an image from one of the video streams may be modified by changing the size, changing the dimensions, changing the sharpness, changing the zoom, changing the brightness, changing the contrast, changing the saturation, other modifications, or any combination thereof to enable and increase an accuracy of computer vision threat detection using the artificial intelligence. In some cases, one large image may be split into two or more smaller images. For example, a static object, such as a point-of-sale terminal, may be used to demarcate the first person (e.g., employee) and the second person (e.g., non-employee). To illustrate, the employee (e.g., retail associate, bank teller, or the like) may be identified by identifying a first side of a counter that includes an input device (e.g., keypad), a cash drawer, or the like. The non-employee may be identified as being on the opposite side of the counter or on the opposite side from the employee. Thus, an image may be divided into a first image that includes the employee and a second image that includes the non-employee and both images may be analyzed independently to determine whether a threat is present.

After identifying one or more threats in the images, the artificial intelligence may determine whether the threats satisfy a particular threshold. For example, if the first person (e.g., employee or a bystander) temporarily holds their arms up in the air and no one is located in the business or a non-employee is identified but does not have a weapon, then the artificial intelligence may determine that the first person is merely stretching and no threat is present because the threshold was not satisfied. As another example, if the first person holds their arms up in the air for more than a predetermined period of time and the artificial intelligence determines that the non-employee is holding a weapon, then the artificial intelligence may determine that the threshold is satisfied (e.g., first person and second person both indicate a threat is present).

As a first example, a computing device may include one or more non-transitory computer-readable media storing instructions executable by one or more processors to perform various operations. The operations may include performing an analysis of a processed image using an artificial intelligence module. The processed image may include a field of view of a location. The operations may include determining, based on the analysis, that the processed image includes one or more threats. For example, the one or more threats may include: (i) a gesture performed by a person, (ii) a posture associated with the person, (iii) a facial expression associated with the person, (iv) a weapon being held by the person, (v) a state of an object in the location, or any combination thereof. For example, the gesture may include at least one of: the person having one hand or both hands up or behind their head, the person making a particular gesture, the person holding at least one hand near or on a particular sign, or any combination thereof. The posture may include at least one of: crouching, lying down, hiding, climbing, punching, kicking, or any combination thereof. The facial expression may indicate at least one of the following: fear, anger, shock, disbelief, surprise, crying, or any combination thereof. The weapon may include at least one of: a gun, a knife, a bat, a pointed object, or any combination thereof. The state of the object may include at least one of: (i) a cash drawer that is open and having an at least partially empty state, (ii) a safe that is open having the at least partially empty state, (iii) a shelf that is at least partially empty, (iv) broken glass, or any combination thereof. The operations may include determining, based on the analysis, details associated with individual threats of the one or more threats. The operations may include determining, based on the details associated with the one or more threats, that a particular threat threshold of a plurality of threat thresholds has been satisfied. The operations may include annotating the processed image to create an annotated image that includes the one or more threats and at least a portion of the details associated with individual threats of the one or more threats. The operations may include sending a notification to one or more designated recipients.

As a second example, one or more non-transitory computer-readable media may store instructions executable by one or more processors to perform various operations. For example, the operations may include receiving or retrieving an image of a set of one or more images and processing the image to create a processed image. For example, processing the image to create the processed image may include: (i) adjusting a image size of the image, (ii) adjusting a sharpness of the image, (iii) adjusting a zoom of the image, (iv) adjusting a brightness of the image, (v) adjusting a contrast of the image, (vi) adjusting a color saturation of the image, (vii) adjusting one or more colors of the image, (viii) converting the one or more colors of the image to a grayscale, (ix) converting the image into two or more portions of the image, or any combination thereof. The operations may include performing an analysis of the processed image using an artificial intelligence module. For example, the artificial intelligence module may use a deep learning neural network or another type of neural network. The processed image may include a field of view of a location. The operations may include determining, based on the analysis, that the processed image includes one or more threats. The one or more threats may include: (i) a gesture performed by a person, (ii) a posture associated with the person, (iii) a facial expression associated with the person, (iv) a weapon being held by the person, (v) a state of an object in the location, or any combination thereof. The operations may include determining, based on the analysis, details associated with individual threats of the one or more threats. For example, the details associated with an individual threat of the one or more threats may include: (i) a locus of the individual threat, where the locus comprising a first person, a second person, or an object, (ii) a type of the individual threat, (iii) a threat level of the individual threat, (iv) a length of time that the individual threats have been detected, (v) a consecutive number of images in which the individual threat has been detected, (vi) a probability associated with the type of the individual threat, or any combination thereof. The operations may include determining, based on the details associated with the one or more threats, that a particular threat threshold of a plurality of threat thresholds has been satisfied. The operations may include annotating the processed image to create an annotated image that includes the one or more threats and at least a portion of the details associated with individual threats of the one or more threats. The operations may include sending a notification to one or more designated recipients. For example, the notification may include one or more of: (i) a thumbnail image of at least one threat of the one or more threats or (ii) a link to view one or more of: an unprocessed image, the processed image, or the annotated image.

As a third example, a computing device may include one or more processors and one or more non-transitory computer-readable storage media to store instructions executable by the one or more processors to perform various operations. The various operations may include, for example, performing an analysis of a processed image using an artificial intelligence module. The processed image may include a field of view of a location. The artificial intelligence module may use a deep learning neural network or another type of neural network. The operations may include determining, based on the analysis, that the processed image includes one or more threats. The operations may include determining, based on the analysis, details associated with individual threats of the one or more threats. The one or more threats may include: a gesture performed by a person, a posture associated with the person, a facial expression associated with the person, a weapon being held by the person, a state of an object in the location, or any combination thereof. The gesture may include at least one of: the person having one or both hands up or behind their head, the person making a particular gesture, the person holding one or both hands near or on a particular sign, or any combination thereof. The posture may include at least one of: crouching, lying down, hiding, climbing, punching, kicking, or any combination thereof. The facial expression may indicate at least one of: fear, anger, shock, disbelief, surprise, crying, or any combination thereof. The weapon may include at least one of: a gun, a knife, a bat, a pointed object, or any combination thereof. The state of the object may include at least one of: a cash drawer that is open and having an at least partially empty state, a safe that is open having the at least partially empty state, a shelf that is at least partially empty, broken glass, or any combination thereof. The operations may include determining, based on the details associated with the one or more threats, that a particular threat threshold of a plurality of threat thresholds has been satisfied. The operations may include annotating the processed image to create an annotated image that includes the one or more threats and at least a portion of the details associated with individual threats of the one or more threats. The operations may include sending a notification to one or more designated recipients.

Figure 1:
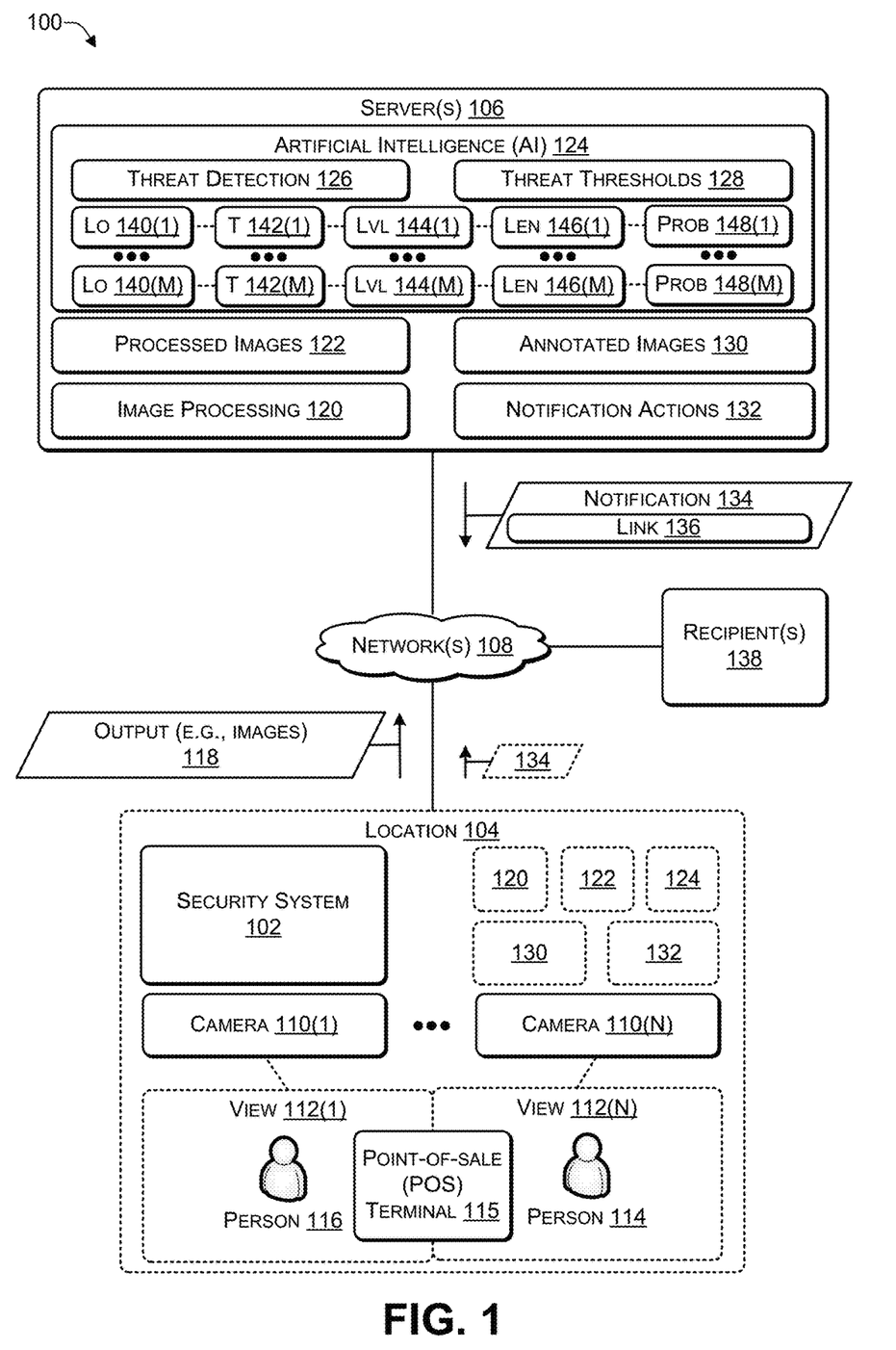
FIG. 1 is a block diagram of a system that includes an artificial intelligence (AI) to analyze the output of a security system, according to some embodiments.

FIG. 1 is a block diagram of a system 100 that includes an artificial intelligence (AI) to analyze the output of a security system, according to some embodiments. In the system 100, a security system 102 is located at a location 104, such as a building (e.g., convenience store, gas station, jewelry store, or the like), a vehicle (e.g., ride-sharing vehicle, bus, airplane, or the like) or any other type of location that can hold 2 or more people. The security system 102 may include one or more devices capable of capturing, displaying, or transmitting a set of (e.g., one or more) images, including a screen capture.

The security system 102 may be connected to a server 106 via one or more networks 108. The servers 106 may, in some cases, be cloud-based. For ease of understanding, various software modules and data are illustrated as being located at the location 104 or at the server 106. However, it should be understood that the various software modules and data described herein may be distributed between the security system 102 (or a computing device at the location 104) and the servers 106. For example, one or more of the software modules and data illustrated as being hosted by the server 106 may be hosted by the security system 102 (or a computing device at the location 104). In addition, in some cases, one or more of the functions described herein may be incorporated into a single board, embedded device, integrated circuit (e.g., a system-on-a-chip) or the like.

The security system 102 may be connected (e.g., wirelessly, wired, or a combination of both) to multiple cameras, such as a camera 110(1) to a camera 110(N) (N>0). For example, the cameras 110 may include one or more imaging devices and other types of sensors such as microphones, motion detectors, and the like. The cameras 110 in addition to capturing visible light, the cameras 110 may be capable of capturing other types of light (e.g., electromagnetic radiation) that are not visible to the human eye, such as infrared, ultraviolet, thermal imaging, and the like. Each of the cameras 110 may have a particular view (e.g., field of view). For example, the camera 110(1) may have a view 112(1) and the camera 110(N) may have a view 112(N). Each of the views 110 may be different from others of the views 110. For example, the view 112(1) may be different from the view 112(N). Each of the views 112 may include one or more objects present in the location 104. For example, in a retail business, one or more of the views 112 may include at least a portion of a person 114 (e.g., a first person) and a point-of-sale terminal 115 or other type of computing device. In some cases, one or more of the views 112 may include a person 116 (e.g., a second person). The person 116 may be a non-employee, such as a customer who intends to make one or more purchases or a potential criminal that intends to perform a crime such as robbing the business at the location 104. In some cases, the point-of-sale terminal 115 may be used to divide an image into two or more portions or used to aim cameras to create two or more fields of view, e.g., a first portion (or first field-of-view) including the person 116 (if present) and the second portion (or second field-of-view) including the person 114.

In some cases, an output 118 (e.g., one or more video streams from the cameras 110) of the security system 102 may be sent to one or more servers 106. For example, the business may have a subscription to a monitoring service (e.g., hosted by the servers 106) that monitors the output 118 of the security system 102 to determine when a threat is detected and perform one or more actions in response to detecting a threat. Each video stream may include a sequence of images captured at a particular rate, such as, for example, 15, 30, 60 frames per second (FPS). Each image may include a timestamp or may include a timecode identifying a particular time when the image was captured. For example, the timestamp or timecode may include a date (e.g., year, month, day) and hours, minutes, seconds, and milliseconds.

The server 106 may include an image processing module 120 that processes the images in the output 118 to create processed images 122. The processed images 122 may be processed in such a way as to enable threats to be more easily detectable by an artificial intelligence (AI) module 124. Thus, the processed images 122 may be processed to be machine-readable (e.g., rather than human-readable) by the AI module 124. The AI 124 may perform an analysis of the processed images 122 including performing threat detection 126 and creating annotated images 130 in which the detected threats are identified (an example of annotated images 130 is provided in FIGS. 2A and 2B). The image processing 120 may receive the images in the output 118 or retrieve the images from a storage location, such as a buffer, or other type of storage. The buffer may enable the AI module 124 to process the output 118 substantially in real-time, e.g., with a relatively small amount of latency (e.g., less than 1 second) without losing any portion of the output 118.

The AI 124 may determine various details associated with one or more threats (e.g., 1 to M, M>0), such as a locus 140 of each threat, a type 142 of each threat, a threat level 144 of each threat, a length 146 of each threat, and a probability 148. The locus 140 may indicate what the threat is associated with, e.g., the person 114 (e.g., scared facial expression, hands up, hiding behind counter, etc.), the person 116 (e.g., threatening facial expression, threatening hand gestures, holding a weapon such as a gun or knife), or an object (e.g., cash drawer, safe, a shelf holding high value items, such as jewelry) in the location 104. The type 142 may indicate the type of threat identified, e.g., facial expression, gesture (e.g., hands up), weapon (e.g., gun, knife, or the like) and so on. The threat level 144 may indicate a level associated with a threat. For example, the person 114 putting their hands up may be stretching if the person 116 is non-threatening and the threat level 144 may indicate no threat. However, if the person 114 has their hands up and/or the person 116 has (1) a threatening facial expression, (2) performs a threatening gesture (e.g., swiping a finger across the throat, shooting gesture, or the like), or (3) is a holding a weapon, then the threat level 144 may be (1) high, (2) higher, or (3) highest, respectively. The length 146 may indicate a length of time that a threat has been identified. For example, the length 146 may include a number of images in which the threat has been identified, a duration (e.g., the last time at which the threat was identified minus the first time at which the threat was identified), or both. For example, the AI 124 determine a threat is present when the threat is detected consecutively in at least a pre-determined number of images (e.g., at least 180 images at 30 fps) or for at least a predetermined amount of time (e.g., at least 6 seconds). The probability 148 may be associated with the type 142 of threat, e.g., 98% probability that the person 116 has a weapon.

If the number and/or type of threats detected by the threat detection 126 satisfies one or more threat thresholds 128, then the server 106 may perform one or more notification actions 132. For example, the threat thresholds 128 may be based on the locus 140, the type of threat 142, the level of threat 144, the length of the threat 146, the probability 148, another factor, or any combination thereof. To illustrate, if a first threat (e.g., hands up in the air) is associated with the person 114 (e.g., first person) and a second threat is also present, then one of the threat thresholds 128 may be satisfied. For example, the second threat may be that the person 116 (e.g., second person) is holding a weapon pointed towards the person 114 (e.g., first person). As another example, the second threat may be that a cash drawer of the point-of-sale terminal 115 is open and is partially or completely empty.

One of the notification actions 132 may include sending a notification 134 that includes a link 136 to one or more recipients 138 specified in the notification actions 132. The link 136 may enable the recipients 138 to view at least a portion of the output 118, the processed images 122, the annotated images 130, or any combination thereof. The recipients 138 may include law enforcement, such as police. The recipients 138 may include an owner (or manager) of the business at the location 104 or a security company that monitors various locations including the location 104. In response to receiving the notification 134, the recipients 138 may view at least a portion of the output 118, the processed images 122, the annotated images 130, or any combination thereof and determine whether to notify law enforcement (e.g., police). For example, in some areas, creating a false alarm by calling law enforcement when no crime is present may result in a fine being levied to a business. To avoid such situations, the recipients 138 may include the owner (or manager) or a security company to enable a human to view what is happening at the location 104 prior to notifying law enforcement. The notification 134 may take the form of a text message, an automated voice message, a posting to a social media site, posting to website, another type of notification message, or any combination thereof. The notification actions 132 may include sounding an alarm at the location 104 or at a remote location, such as at a security company monitoring the location 104 or at the home of an owner of manager of the business at the location 104.

The notification actions 132 may include sounding an alarm (e.g., at the location 104, at a security company that is monitoring the location 104, at the home of the owner of the business, or any combination thereof), playing an audio file (e.g., "Police have been alerted"), sending a message (e.g., text or voice message), a social media posting, website posting, sharing an image stream or a link to a live stream (e.g., the output 118, the annotated images 130, or both). The message, call, or social media post may include one or more of: a name of the location 104, an address or other type of coordinates associated with the location 104, the link 136 to a secure website that shows one or more images of the annotated images 130, the output 118, or both, instructions on how to access the secure website, other information (e.g., the person 116 (e.g., second person) has a weapon, the person 114 (e.g., first person) (e.g., employee) has taken money out of the POS terminal 115 or a safe, and the like), or any combination thereof. The streaming (e.g., the output 118, the annotated images 130, or both) may be access via a password or via a unique universal resource locator (URL). The site where the streaming is available may enable a viewer to share the streaming with others (e.g., owner of business or security company may share with law enforcement).

The AI 124 may include one or more deep learning neural networks (e.g., convolution neural network) and may be trained using supervised learning, unsupervised learning, reinforcement learning, self-learning, or any combination thereof. The AI 124 may detect a weapon and consider the weapon a threat if the weapon is visible for more than a predetermined number of images (or predetermined length of time). For example, many states allow citizens to legally and, in some cases, openly carry a firearm ("open carry"). Thus, the detection of a weapon associated with the person 116 (e.g., second person) may be insufficient to cause the AI 124 to determine that a threat is present. If the person 116 grasps the weapon or if the person 114 performs a particular gesture (e.g., both hands in the air), then the AI 124 may determine that a threat is present. The AI 124 may analyze an emotion conveyed by a facial expression of the person 114, the person 116, or both. For example, the AI 124 may take into account how long the person 114 has a particular expression, such as a shocked expression, a fearful expression, crying (e.g., one or more tears present), a distracted expression, blinks frequently or in a particular pattern (e.g., 3 short blinks followed by 3 long blinks followed by 3 short blinks, alternating long and short blinks, or the like).

In this way, the output 118 of the security system 102 may be analyzed using the AI 124 to determine whether one or more threats are present. If the AI 124 detects one or more threats and the threats satisfy the threat thresholds 128, then the server 106 may perform the one or more notification actions 132 by, for example, sending the notification 134 including the link 136 to one or more recipients 138 specified in the notification actions 132. In some cases, the cameras 110 may include one or more cameras that are external to the location 104 and have a view of a parking lot of the location 104. In such cases, the cameras may capture images of vehicles parked in the parking lot including, for example, a make, a model, license plate, other relevant information associated with the vehicles, or any combination thereof. In this way, one law enforcement is notified, they may be able to run the license plates to determine whether a particular vehicle in the parking lot is associated with a criminal, has been reported stolen, or the like.

While the image processing 120, the AI 124, the annotated images 130, and the notification actions 132 are shown as being performed on the server 106, in some cases, one or more of these functions may be performed at the location 104. Thus, it should be understood that the functionality described herein may be divided in any number of ways between the location 104 and the server 106. For example, the image processing 120 may be performed at the location 104 and the process images 122 may be sent as the output 118 to the server 106. As another example, the image processing 120, the AI 124, or both may be performed at the location 104 and the notification 134 may be sent by the security system 102 (or by a computing device at the location 104) rather than the server 106. In some cases, one or more of the functions described herein may be incorporated into an embedded controller, integrated circuit, system-on-a-chip (SOC), or the like.

While a single representative location 104 is shown in FIG. 1 for ease of understanding, it should be understood that the server 106 may receive the output of multiple security systems from multiple locations. Thus, the server 106 may monitor multiple locations substantially simultaneously. For example, in some cases, the server 106 may be associated with a security company that is monitoring multiple business locations. The server 106 may send the notification 134 to an employee of the security company when one or more threats have been detected and the one or more threats satisfy at least one of the threat thresholds 128.

Thus, a system may receive (or retrieve) multiple video streams from multiple cameras (and, in some cases, other types of sensors) or as screenshot of one or multiple display devices. An image processing module may process each image of the multiple video streams to create processed images. The AI module may analyze individual images of the process images to determine whether one or more threats are present. If the AI detects one or more threats, the AI may determine whether the number of threats, a length of time for which each threat has been present, or other threat related characteristics satisfy one or more threat thresholds. If the threat thresholds are satisfied, then a notification may be automatically (e.g., without human interaction) sent to one or more recipients, such as law enforcement, a business owner or manager, a security company, another recipient, or any combination thereof.

Figure 2A:
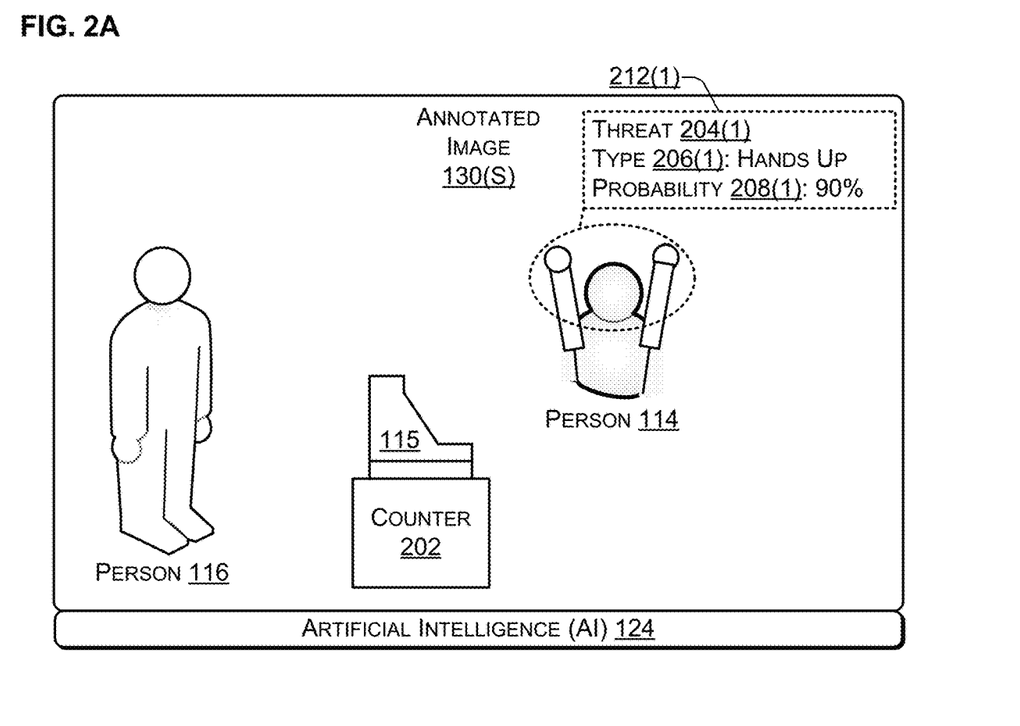
FIG. 2A and FIG. 2B illustrate annotated images, according to some embodiments.
Figure 2B:
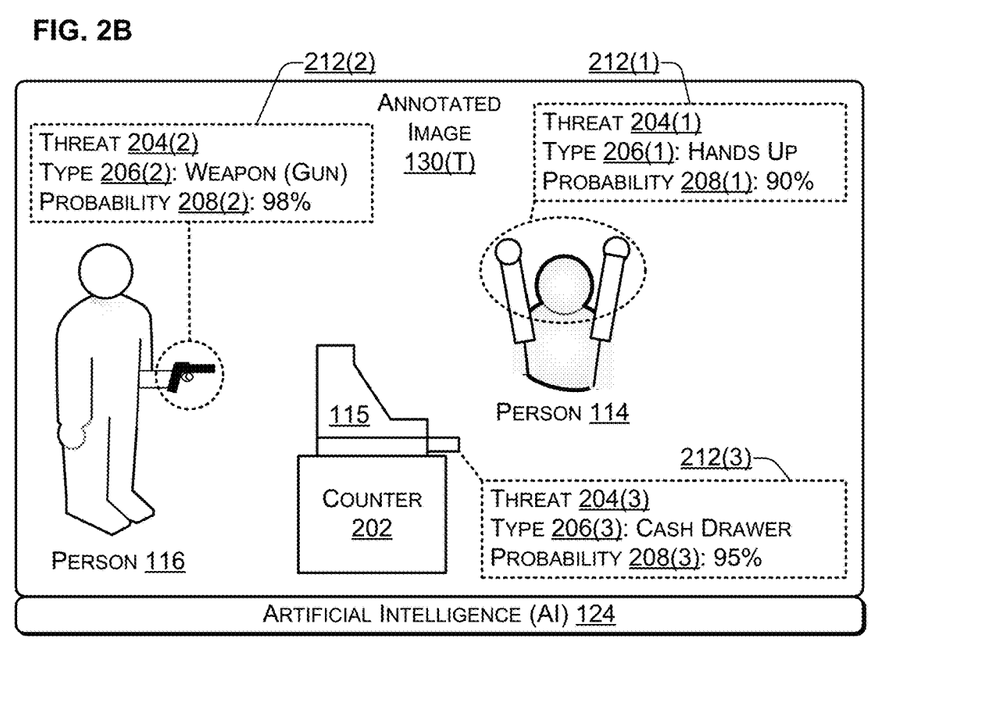

FIG. 2A and FIG. 2B illustrate annotated images, according to some embodiments. The annotated images 130 of FIG. 1 may include an annotated image 130(S) of FIG. 2A captured at a time S and an annotated image 130(T) of FIG. 2B captured at a time T, where T>S. Thus, annotated image 130(T) is subsequent to annotated image 130(S). The artificial intelligence (AI) 124 of FIG. 1 may add annotations 212, such as threat information, to the processed images 122 or the output 118 of the security system 102, to create the annotated images 130.

The annotated image 130(S) of FIG. 2A includes the person 114 (e.g., first person), the person 116 (e.g., second person), and the point-of-sale terminal 115 (located on a counter 202). In the annotated image 130(S), an annotation 212(1) indicates that the person 114 has their hands up. The annotation 212(1) provided by the AI 124 may include information that a threat 204(1) was detected, a type 206(1) of the threat, e.g., the person 114 has their hands up, and a probability 208(1) of the predicted threat. The annotation 212(1) may be visually linked (e.g., using lines, as shown in FIGS. 2A and 2B, or a similar technique) to the locus. In annotated image 130(S), the annotation 212(1) is associated with the person 114 (e.g., the locus) and specifically the first person's hands. In some cases, the probability 208(1) may increase over time. For example, at a time T1, when the person 114 (e.g., first person) puts their hands up, the AI 124 may determine that no other threat is present and may predict, based on past experience, that the person 114 (e.g., first person) is stretching their arms. However, if at a time Tx (x>0, such as 10 seconds) the person 114 (e.g., first person) still has their hands up, then the AI 124 may determine that a threat is present. The probability 208(1) of a threat may increase proportional to the amount of time that the person 114 (e.g., first person) has their hands up. For example, after one second the probability may be 10%, after two seconds the probability may be 20% and so on, and the probability of a threat at ten seconds (or more) may be 100%. In some cases, the probability of a threat may be determined based on how many frames include the person 114 making a particular gesture. For example, in FIGS. 2A and 2B, T-S represents how long the person 114 has had their hands up. If T−S>=V, where V is a predetermined period of time, then the AI 124 may determine that a threat is present. If T−S<V, then the AI 124 may determine that a threat is absent (e.g., no threat present).

In FIG. 2B, the annotated image 130(T) has multiple annotations 212(1), 212(2), and 212(3). Annotated image 130(T) is subsequent to annotated image 130(S) and has the annotation 212(1) indicating that the person 114 has their hands up and an annotation 212(2) indicating that a threat 204(2) was detected with the person 116. The annotation 212(2) indicates that a type 206(2) of the threat is a weapon. In some cases, the AI 124 may further identify the type of weapon. For example, as shown in FIG. 2B, the AI 124 has identified the weapon as a gun and indicated this in the annotation 212(2). The AI 124 may identify in the annotation 212(2) a probability 208(2) associated with the identification of the type 206(2) of threat, e.g., a weapon. In this example, the AI 124 indicates that a weapon in the form of a gun has been identified with the probability of 98%.

In FIG. 2B, the AI 124 may identify multiple threats, including a first threat associated with the person 114 (locus 1) and a second threat associated with the person 116 (locus 2). Based on the threat thresholds 128, the identification of two threats may be sufficient to satisfy one of the threat thresholds 128, causing the server 106 of FIG. 1 to automatically send the notification 134 including the link 136 to the recipients 138. In FIG. 2B, even if the person 114 has not had their hands up for very long (e.g., less than 1 second), the AI 124 may determine that one of the threat thresholds 128 is satisfied because the AI 124 detected the second threat, e.g., the weapon being held by the person 116.

The AI 124 may provide an annotation 212(3) indicating a third threat 204(3) with a type 206(3) of a partially or fully empty cash register (locus 3), with a probability 208(3) that this is a threat of 95%. The third threat 204(3) is associated with an object in the location 104 of FIG. 1 and may be a cash tray of the point-of-sale terminal 115, a safe, a shelf that holds high value objects (e.g., jewelry) or the like. The threat thresholds 128 may indicate that if threat 204(3) and either threat 204(2) or 204(1) are detected, to automatically (e.g., without human interaction) perform one or more of the notification actions 132. The threat thresholds 128 may be initially by an owner of a business or the security system provider and then modified (e.g., adjusted) based on the AI 124. For example, the AI 124 may be periodically (e.g., at a predetermined time interval, such as every P months, P>0) retrained with additional data to further increase accuracy. By training the AI 124 using additional training data, the AI 124 may identify at least some threat thresholds to add to the threat thresholds 128.

In some cases, the annotations 212 may indicate a length that each threat has been present, e.g., either in terms of a number of images in which the threat has been identified, a length of time during which the threat has been identified, or both. In other cases, each of the annotations 212 may be added to the images after a predetermined length. For example, each of the annotations 212 may be added after the threat was detected in at least X images (e.g., at a particular fps) or for at least Y seconds.

Thus, an AI module may identify one or more threats in an image and annotate the image to indicate the presence of a threat, identify the type of threat, provide a probability associated with the prediction of the threat, and other threat-related information. The threat may be associated with a first person (e.g., employee), such as the first person putting their hands up in the air, the first person hiding behind a counter or other furniture, or the like. The threat may be associated with a second person that is located near the first person, such as a second person with a weapon, a second person that is making a threatening gesture, or the like. The threat may be associated with an object in the location, such as a cash drawer, a safe, a shelf that includes valuable objects (e.g., jewelry), or the like. Based on the number of threats detected, the type of threats, how long the threats have been present, and the like, a determination may be made whether one or more threat thresholds have been satisfied. If one of the threat thresholds has been satisfied, then a notification may be sent to one or more recipients to notify them of the detected threat. The recipients may include, for example, law enforcement, security company, an owner or a manager of a business, another type of recipients, or any combination thereof.

In the flow diagrams of FIGS. 3, 4, 5, and 6 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, 500, and 600 are described with reference to FIGS. 1, 2A, and 2B as described above, although other models, frameworks, systems and environments may be used to implement this process.

Figure 3:
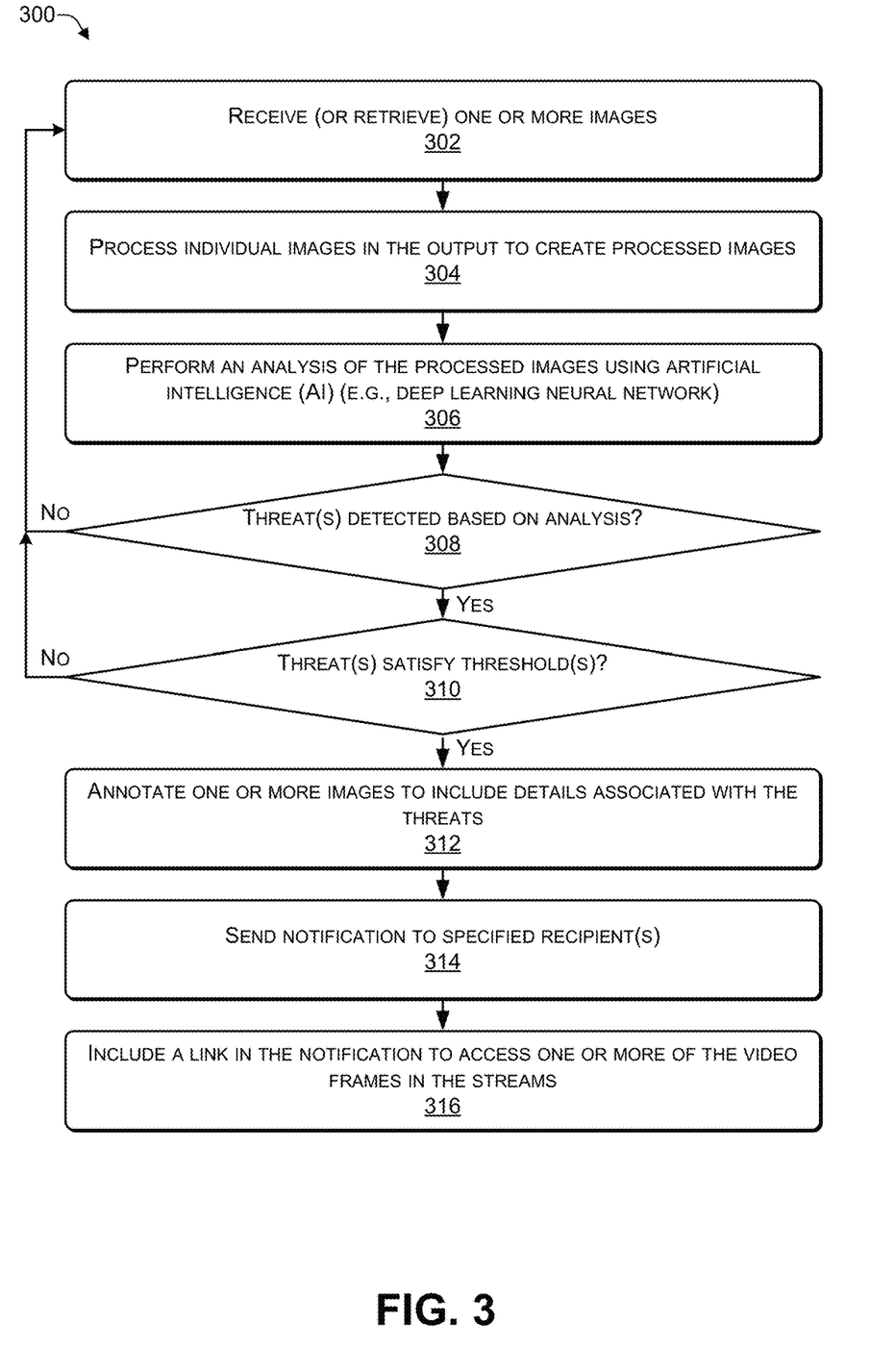
FIG. 3 is a flowchart of a process that includes sending a notification to one or more specified recipients after detecting a threat, according to some embodiments.

FIG. 3 is a flowchart of a process 300 that includes sending a notification to one or more specified recipients after detecting a threat, according to some embodiments. The process 300 may be performed by a server, such as the server 106 of FIGS. 1, 2A, and 2B. Of course, in some cases, at least a portion of the functionality described as being performed by the server 106 may be located at the location 104. For example, the image processing 120, the AI 124, the threat detection 126, the threat thresholds 128, the annotated friends 130, the notification actions 132, or any combination thereof may be performed at the location 104 by a computing device that is connected to the security system 102 or by the security system 102 itself.

At 302, the server may receive or retrieve an output (e.g., one or more streams of images) from a security system. At 304, the server may process individual images in the output (e.g., in each stream) to create processed images. For example, in FIG. 1, the server 106 may receive the output 118 from the security system 102 and use the image processing module 120 to create the processed images 122. The processed images 122 may be processed to increase machine readability to enable the AI 124 to detect threats in the process images 122.

At 306, the server may perform an analysis of the processed images using artificial intelligence (e.g., a deep learning neural network). At 308, the server may determine whether one or more threats were detected based on the analysis. If the server determines, at 308, that no threats were detected based on the analysis, then the process may proceed back to 302. If the server determines, at 308 that one or more threats were detected based on the analysis, then the process may proceed to 310. For example, in FIG. 1, the server 106 may perform an analysis of the processed images 122 using the AI 124. Based on the analysis, the server 106 may determine whether one or more threats (e.g., the person 114 holding up their hands, a weapon in the possession of the person 116, cash being removed from the point-of-sale terminal 115, or the like) have been detected in the processed images 122. If the server 106 determines that no threats were detected by the AI 124, then the server 106 may continue to process the output 118 from the security system 102 and analyze the processed images 122 using the AI 124.

At 310, the server may determine whether the threats that were detected satisfy one or more thresholds. If the server determines, at 310, that the threats that were detected fail to satisfy the one or more thresholds, then the process may proceed to 302. If the server determines, at 310 that the threats that were detected satisfy one or more of the thresholds, then the process may proceed to 312. For example, in FIG. 1, the server 106 may determine whether the threats detected by the AI 124 satisfy one or more of the threat thresholds 128. For example, if the person 114 is holding up their hands for a brief period of time and no threat is associated with the person 116 or the point-of-sale terminal 115, then the AI 124 may determine that the threat (e.g., person 114 has their hands up for a brief period of time) detected by the AI 124 fails to satisfy any of the threat thresholds 128 and may continue to process the output 118 to create the processed images 122 and to analyze the processed images 122 using the AI 124. If the person 114 is holding up their hands and the person 116 is in possession of a weapon or the point-of-sale terminal 115 is half or completely empty of cash, then the AI 124 may determine that one of the threat thresholds 128 has been satisfied.

At 312, the server may annotate one or more images to include details associated with the threats. At 314, the server may send a notification to one or more specified recipients. At 316, the server may include a link in the notification to enable the specified recipient(s) to access one or more of the images (e.g., annotated images or unannotated images) in the stream. For example, in FIG. 2B, the AI 124 may create the annotated image 130(T) that includes the annotations 212(1), 212(2), and 212(3). In FIG. 1, after determining that the threats in the processed images 122 satisfy at least one of the threat thresholds 128, the AI 124 may create the annotated images 130 and perform one or more of the notification actions 132. For example, the server 106 may send the notification 134 to one or more of the recipients 138 specified in the notification actions 132. In some cases, the server 106 may include the link 136 in the notification 134 to enable the recipients 138 to view at least a portion of the annotated images 130, the output 118, or both.

Thus, a server may receive the output (e.g., multiple video streams where each video stream includes multiple images) of a security system that includes multiple cameras. The server may process the images to improve their machine readability. The server may use an AI, such as a deep learning neural network, to analyze the processed images. If the AI detects one or more threats in the processed images, the AI may annotate the images to indicate the type of threat, the locus of the threat, how long the threat has been present, other details associated with the threat (e.g., identify a type of weapon being held), and the like. The server may determine whether the threats satisfy one or more threat thresholds (e.g., specified based on types of threats, number of threats, how long the threats are present, and the like). If the threats fail to satisfy the one or more threat thresholds, the server may continue to process the output of the security system. If the threats satisfy at least one of the threat thresholds, then the server may send a notification to one or more previously specified recipients and, in some cases, include a link in the notification to enable the specified recipients to view at least a portion of the annotated images. The advantage provided is that the first person does not have to wait until the second person has left of the location to call law enforcement. Instead, the system uses AI to automatically identify threats, determine whether the threats satisfy one or more threat thresholds, and when the threats satisfy at least one of the threat thresholds, the system may automatically send a notification to one or more recipients, such as an owner of the business, a security company that monitors the business, law enforcement, another recipient, or any combination thereof. By reducing the time between when a threat occurs and when one or more recipients are notified of the threat, perpetrators of a robbery can be quickly apprehended, sometimes before they have left the scene of the crime or shortly after they have left the scene of the crime.

Figure 4:
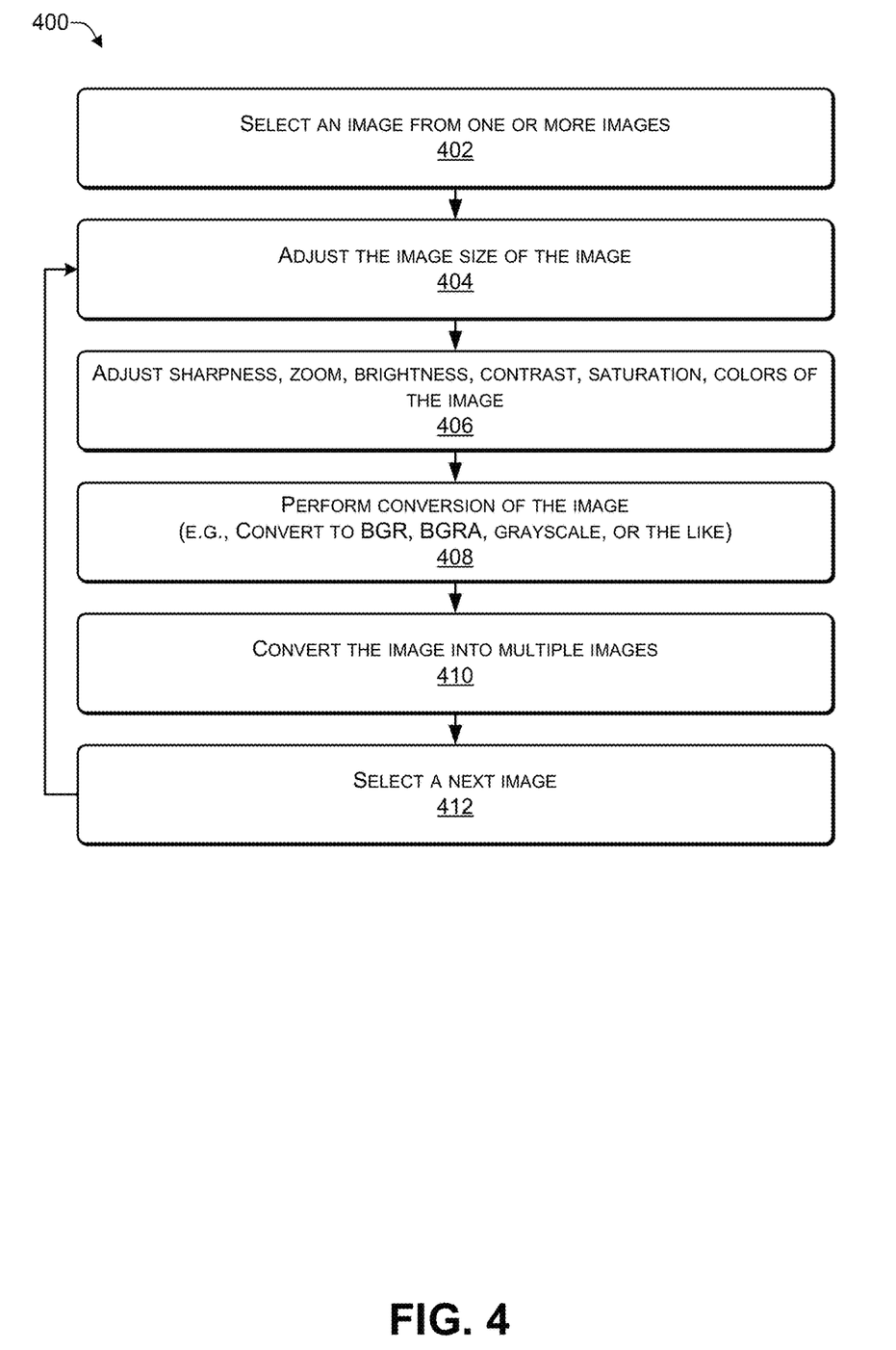
FIG. 4 is a flowchart of a process that includes adjusting various characteristics of an image, according to some embodiments.

FIG. 4 is a flowchart of a process 400 that includes adjusting various characteristics of a image, according to some embodiments. The process 400 may be performed by the image processing module 120 of FIG. 1.

At 402, the process may select a image from a stream of one or more images (e.g., video). At 404, the process may adjust an image size of the image. At 406, the process may adjust one or more of sharpness, zoom, brightness, contrast, saturation, colors, or any combination thereof associated with the image. At 408, the process may perform a conversion of the image from a first format to a second format. For example, in FIG. 1, each of the images of the output 118 may be captured in a particular size, such as 800×600, 1200×900, 1280×720, 1920×1080 pixels, or the like. To enable rapid processing of the output 118, in some cases the size may be reduced. For example, the image processing module 120 may reduce a size of images (e.g., from 1200×900 to 800×600) to enable faster processing of the processed images 122. The image processing module 120 may modify the sharpness of one or more images from the output 118 to enable the AI 124 to more easily detect threats. The image processing module 120 may perform zooming (e.g., digital zoom) of individual images in the output 118. For example, the image processing module 120 may divide an individual image into three portions, a first portion that includes the person 114 (e.g., first person), a second portion that includes an object, such as the point-of-sale terminal 115, and a third portion that includes the person 116 (e.g., second person). In this way, the AI 124 can analyze each of the three portions to determine whether there is a threat associated with the person 114, the point-of-sale terminal 115, or the person 116. The image processing 120 may adjust the brightness, contrast, saturation, and number of colors to enable the AI 124 to more easily detect threats in the processed images 122. In some cases, the selected image may be captured as or converted (by the image processing 120) to a format such as RGB (Red, Green, Blue), RGBA (Red, Green, Blue, Alpha), BGR (Blue, Green, Red), BGRA (Blue, Green, Red, Alpha), or grayscale.

Thus, images output by a security system may be processed to enable an AI to more easily detect threats. For example, the video processing may be used to make the processed images machine readable for inferencing and training.

Figure 5:
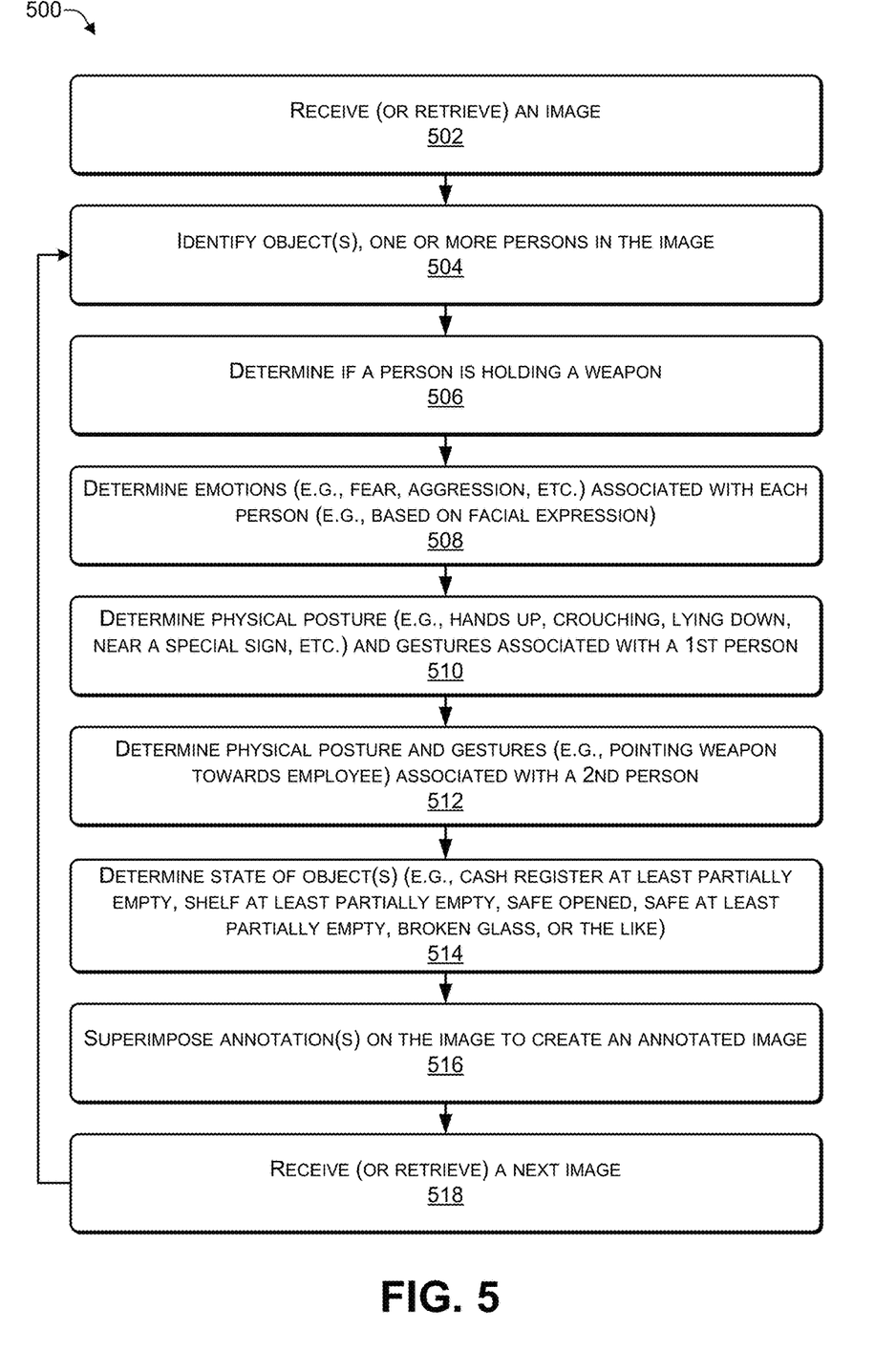
FIG. 5 is a flowchart of a process that includes determining whether an image indicates a threat, according to some embodiments.

FIG. 5 is a flowchart of a process 500 that includes determining whether a image indicates a potential threat, according to some embodiments. The process 500 may be performed by the AI 124 of FIGS. 1, 2A, and 2B.

At 502, the process may receive (or retrieve) a image (e.g., a processed image). At 504, the process may identify in the image (i) a state of one or more objects (e.g., point-of-sale terminal, cash register, safe, shelves with high value items, or the like), (ii) at least one first person, and if present, (iii) a second person (e.g., a non-employee). For example, in FIG. 1, the AI 124 may receive (or retrieve) one of the processed images 122. In FIG. 2A, the process may identify a person 114, the point-of-sale terminal 115, and if present, a person 116.

At 506, the process may determine if a person is holding a weapon. For example, in FIG. 2B, the process may determine whether a person 116 is holding a weapon, such as a gun, a knife, or the like.

At 508, the process may determine (e.g., based on facial expressions) emotions associated with the first person, the second person, or both. For example, in FIGS. 2A and 2B, the AI 124 may analyze a facial expression of the person 114 (e.g., first person) and determine one or more emotions (e.g., fear, surprise, or the like) expressed by the facial expression of the person 114. The AI 124 may analyze a facial expression of the person 116 and determine one or more emotions (e.g., anger, aggression, or the like) expressed by the facial expression of the person 116.

At 510, the process may determine a physical posture (e.g., hands up, crouching, lying down, hand near a special sign, or the like) and gestures associated with the first person in the image. At 512, the process may determine a physical posture (e.g., weapon pointed towards first person) and gestures (e.g., pointing at a cash drawer of a point-of-sale terminal, pointing at a shelf with high value items, or the like) associated with the second person. For example, in FIGS. 2A and 2B, the AI 124 may determine that the physical posture of the person 114 includes the person 114 holding both arms up in the air. In FIG. 2B, the AI 124 may determine that the physical posture of the person 116 includes the person 116 pointing a weapon at the person 114.

At 514, the process may determine one or more physical indicators (e.g., cash register half or completely empty, shelf partially or fully empty, safe opened, safe partially or fully empty, glass broken, or the like) in the image. At 516, the process may superimpose one or more annotations on the image to create an annotated image. At 518, the process may receive or retrieve a next image and proceed to 504. For example, in FIG. 2B, the process may determine one or more physical indicators, such as determining that the cash drawer of the point-of-sale terminal 115 is partially or completely empty. The process may annotate the image to create the annotated image 130(T) of FIG. 2B. The process may receive or retrieve a next image and proceed to analyze the next image.

Thus, an AI may analyze the image from a stream of images. The AI may identify (e.g., detect, predict, classify, or determine) one or more objects, one or more employees, and one or more persons (e.g., non-employees) in the image. The AI may determine whether one or more of the persons are holding a weapon. The AI may perform an analysis of a facial expression of the first person to determine one or more emotions being expressed by the facial expression of the first person and the second person. The AI may determine a physical posture and gestures associated with the first person, such as holding the hands up, hiding behind the counter, or the like the AI may determine a physical posture and gestures associated with the second person, such as the second person holding a weapon and pointing the weapon at the first person (e.g., employee). The AI may determine physical indicators, such as a partially or fully empty cash register/drawer, a partially or fully empty safe, one or more high-value items (e.g., jewelry) missing from a shelf, an open safe, broken/shattered glass, other physical indicators, or any combination thereof. The AI may superimpose annotations on the image to create an annotated image in which the different threats (e.g., first person has hands up, second person has a weapon pointed at the first person, cash drawer of point-of-sale terminal is open, or the like) are identified.

Figure 6:
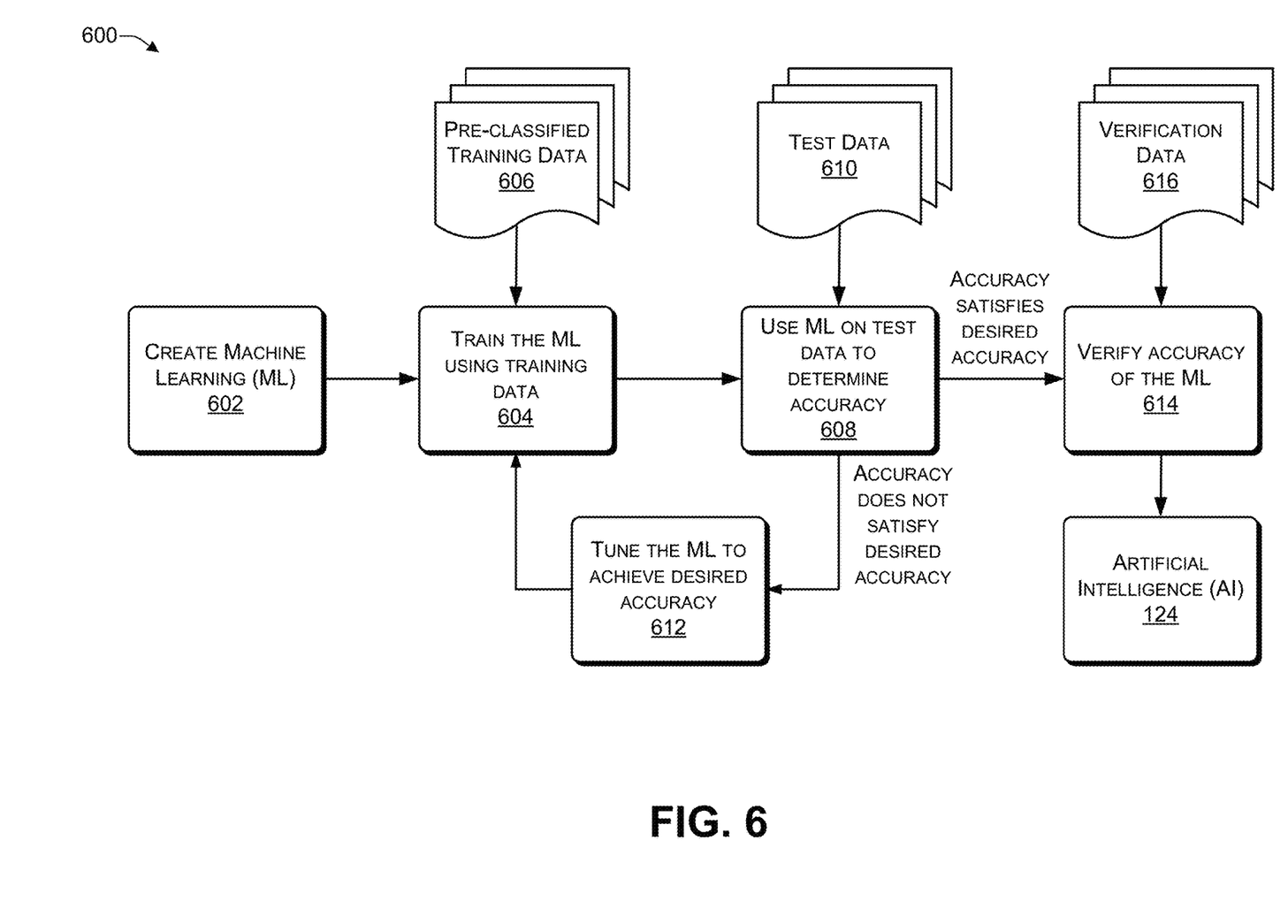
FIG. 6 is a flowchart of a process to train a machine learning algorithm to create a classifier, according to some embodiments.

FIG. 6 is a flowchart of a process 600 to train a machine learning algorithm to create the AI 124, according to some embodiments. The process 700 may be performed by a server, such as the server 106 of FIGS. 1, 2A, and 2B.

At 602, a machine learning algorithm (e.g., software code) may be created by one or more software designers. At 604, the machine learning algorithm may be trained using pre-classified training data 606 (e.g., a portion of the conversation data 136 that has been pre-classified). For example, the training data 606 may have been pre-classified by humans, by machine learning, or a combination of both. After the machine learning has been trained using the pre-classified training data 606, the machine learning may be tested, at 608, using test data 610 to determine an accuracy of the machine learning. For example, in the case of a classifier, the accuracy of the classification may be determined using the test data 610.

If an accuracy of the machine learning does not satisfy a desired accuracy (e.g., 95%, 98%, 99% accurate), at 608, then the machine learning code may be tuned, at 612, to achieve the desired accuracy. For example, at 612, the software designers may modify the machine learning software code to improve the accuracy of the machine learning algorithm. After the machine learning has been tuned, at 612, the machine learning may be retrained, at 604, using the pre-classified training data 606. In this way, 604, 608, 612 may be repeated until the machine learning is able to classify the test data 610 with the desired accuracy.

After determining, at 608, that an accuracy of the machine learning satisfies the desired accuracy, the process may proceed to 614, where verification data 616 (e.g., a portion of the conversation data 136 that has been pre-classified) may be used to verify an accuracy of the machine learning. After the accuracy of the machine learning is verified, at 614, the machine learning 130, which has been trained to provide a particular level of accuracy may be used as the AI 124. For example, the AI 124 may be trained to predict a type of weapon, what a particular facial expression indicates, what a particular posture indicates, what a particular hand gesture indicates, and the like.

Figure 7:
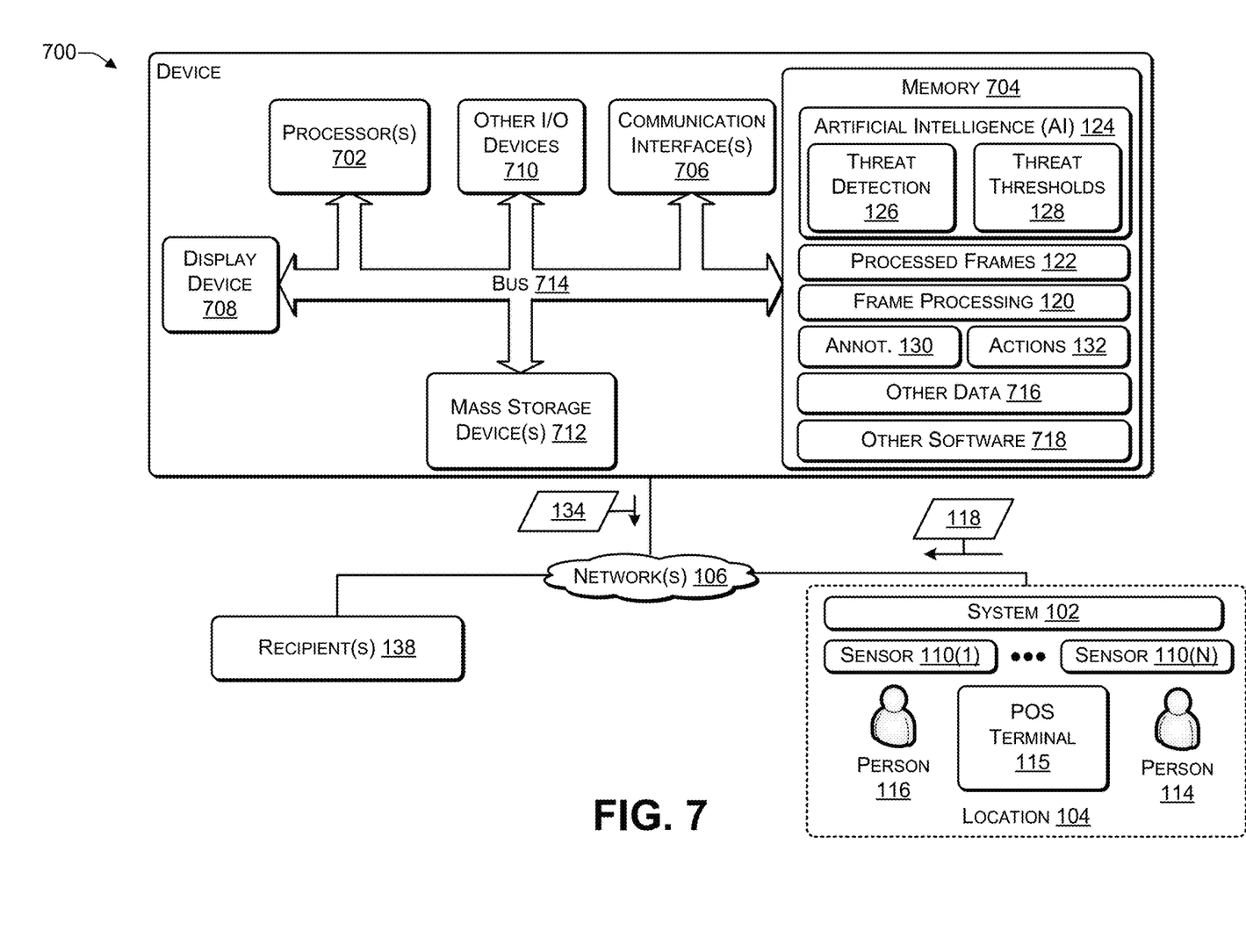
FIG. 7 illustrates an example configuration of a computing device that can be used to implement the systems and techniques described herein.

FIG. 7 illustrates an example configuration of a device 700 that can be used to implement the systems and techniques described herein, such as for example, the security system 102, a computing device located at the location 104, and/or the server 106 of FIG. 1. For illustration purposes, the device 700 is illustrated in FIG. 7 as implementing the server 106 of FIGS. 1, 2A, and 2B.

The device 700 may include one or more processors 702 (e.g., CPU, GPU, or the like), a memory 704, communication interfaces 706, a display device 708, other input/output (I/O) devices 710 (e.g., keyboard, trackball, and the like), and one or more mass storage devices 712 (e.g., disk drive, solid state disk drive, or the like), configured to communicate with each other, such as via one or more system buses 714 or other suitable connections. While a single system bus 714 is illustrated for ease of understanding, it should be understood that the system buses 714 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 702 are one or more hardware devices that may include a single processing unit or a number of processing units, all of which may include single or multiple computing units or multiple cores. The processors 702 may include a graphics processing unit (GPU) that is integrated into the CPU or the GPU may be a separate processor device from the CPU. The processors 702 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 702 may be configured to fetch and execute computer-readable instructions stored in the memory 704, mass storage devices 712, or other computer-readable media.

Memory 704 and mass storage devices 712 are examples of computer storage media (e.g., memory storage devices) for storing instructions that can be executed by the processors 702 to perform the various functions described herein. For example, memory 704 may include both volatile memory and non-volatile memory (e.g., RAM, ROM, or the like) devices. Further, mass storage devices 712 may include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein and may be any type of non-transitory media capable of storing computer-readable, processor-executable program instructions as computer program code that can be executed by the processors 702 as a particular machine configured for carrying out the operations and functions described in the implementations herein.

The device 700 may include one or more communication interfaces 706 for exchanging data via the network 110. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 706 can also provide communication with external storage, such as a storage array, network attached storage, storage area network, cloud storage, or the like.

The display device 708 may be used for displaying content (e.g., information and images) to users. Other I/O devices 710 may be devices that receive various inputs from a user and provide various outputs to the user, and may include a keyboard, a touchpad, a mouse, a printer, audio input/output devices, and so forth.

The computer storage media, such as memory 116 and mass storage devices 712, may be used to store software and data, including, for example, the AI 124, the processed images 122, the image processing 120, the notification actions 130, other data 716, and other software 718. For ease of illustration, not all the software and data associated with the server 106 are shown.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving, by one or more processors, a video stream from a security system associated with a business;
    processing, by the one or more processors, a frame from the video stream to create a processed frame;
    performing an analysis of the processed frame using an artificial intelligence module executed by the one or more processors, the analysis identifying in the processed frame at least one of:
    a posture of a person,
    a gesture performed by the person,
    a facial expression of the person,
    a weapon, or
    a state of an object;
    determining, by the one or more processors and based on the analysis, that the processed frame includes one or more threats;
    determining, by the one or more processors and based on the analysis, details associated with individual threats of the one or more threats;
    determining, by the one or more processors and based on the details associated with the one or more threats, that a particular threat threshold of a plurality of threat thresholds has been satisfied, the particular threat threshold comprising a particular type of threat and a length of time that the particular type of threat is present;
    annotating, by the one or more processors, the frame to create an annotated frame that includes the one or more threats and at least a portion of the details associated with individual threats of the one or more threats; and
    sending, by the one or more processors, a notification to a designated recipient, the notification including a link to view the annotated frame.

2. The method of claim 1, wherein the posture associated with the person comprises at least one of:

holding at least one arm up;
holding at least one hand behind a person's head;
holding both hands behind a person's back;
crouching; or
lying down.

3. The method of claim 1, wherein processing the frame to create the processed frame comprises:
adjusting a frame size of the frame;
adjusting a sharpness of the frame;
adjusting a zoom of the frame;
adjusting a brightness of the frame;
adjusting a contrast of the frame;
adjusting a color saturation of the frame;
adjusting one or more colors of the frame;
converting the one or more colors of the frame to a grayscale;
converting the frame into two or more portions of the frame; or
any combination thereof.

4. The method of claim 1, wherein the state of the object comprises:
an open state of a cash drawer;
at least a partially empty state of the cash drawer;
an open state of a safe;
at least a partially empty state of the safe;
at least a partially empty state of a particular shelf;
broken glass; or
any combination thereof.

5. The method of claim 1, wherein the details associated with individual threats include:
a locus comprising one of the person, or the object;
a threat type;
a threat level determined based at least in part on the facial expression of the person, a threatening gesture, or the weapon in the processed frame;
a length of time individual threats have been detected;
a consecutive number of frames that individual threats have been detected;
a probability associated with the threat type; or
any combination thereof.

6. The method of claim 1, wherein the gesture comprises:
a first gesture that indicates a presence of a threat; or
a second gesture performed near a particular sign.

7. The method of claim 1, wherein the designated recipient comprises:
an owner or a manager of a business that includes a security system outputting one or more video streams that include a frame used to create the processed frame;
a security company monitoring the security system;
a law enforcement agency; or
any combination thereof.

8. A memory device to store instructions executable by one or more processors to perform operations comprising:
receiving a video stream from a security system associated with a business;
processing a frame from the video stream to create a processed frame;
performing an analysis of the processed frame using an artificial intelligence module the analysis identifying in the processed frame at least one of:
a posture of a person,
a gesture performed by the person,
a facial expression of the person,
a weapon, or
a state of an object;
determining, based on the analysis, that the processed frame includes one or more threats;
determining, based on the analysis, details associated with individual threats of the one or more threats;
determining, based on the details associated with the one or more threats, that a particular threat threshold of a plurality of threat thresholds has been satisfied, the particular threat threshold comprising:
a particular type of threat; and
a length of time that the particular type of threat is present;
annotating the frame to create an annotated frame that includes the one or more threats and at least a portion of the details associated with individual threats of the one or more threats; and
sending a notification to a designated recipient, the notification including a link to view the annotated frame.

9. The memory device of claim 8, wherein the posture associated with the person comprises at least one of:
holding both arms up;
holding both hands behind a person's head;
holding both hands behind a person's back;
crouching; or
lying down.

10. The memory device of claim 8, wherein processing the frame to create the processed frame comprises:
adjusting a frame size of the frame;
adjusting a sharpness of the frame;
adjusting a zoom of the frame;
adjusting a brightness of the frame;
adjusting a contrast of the frame;
adjusting a color saturation of the frame;
adjusting one or more colors of the frame;
converting the one or more colors of the frame to a grayscale;
converting the frame into two or more portions of the frame; or
any combination thereof.

11. The memory device of claim 8, wherein the facial expression indicates:
fear,
surprise,
anger,
aggression
or
any combination thereof.

12. The memory device of claim 8, wherein the details associated with individual threats include:
a locus comprising one of the person, or the object;
a threat type;
a threat level determined based at least in part on the facial expression of the person, a threatening gesture, or the weapon in the processed frame;
a length of time individual threats have been detected;
a consecutive number of frames that individual threats have been detected;
a probability associated with the threat type; or
any combination thereof.

13. The memory device of claim 8, wherein the gesture comprises:
a first gesture that indicates a presence of a threat; or
a second gesture performed near a particular sign.

14. The memory device of claim 8, wherein the artificial intelligence module uses a deep learning neural network.

15. A computing device comprising:
one or more processors; and
one or more non-transitory computer-readable storage media to store instructions executable by the one or more processors to perform operations comprising:

receiving a video stream from a security system associated with a business;
processing a frame from the video stream to create a processed frame;
performing an analysis of the processed frame using an artificial intelligence module the analysis identifying in the processed frame at least one of:
a posture of a person,
a gesture performed by the person,
a facial expression of the person,
a weapon, or
a state of an object;
determining, based on the analysis, that the processed frame includes one or more threats;
determining, based on the analysis, details associated with individual threats of the one or more threats;
determining, based on the details associated with the one or more threats, that a particular threat threshold of a plurality of threat thresholds has been satisfied, the particular threat threshold comprising:
a particular type of threat; and
a length of time that the particular type of threat is present;
annotating the frame to create an annotated frame that includes the one or more threats and at least a portion of the details associated with individual threats of the one or more threats; and
sending a notification to a designated recipient, the notification including a link to view the annotated frame.

16. The computing device of claim 15, wherein the posture comprises at least one of:
holding both arms up;
holding both hands behind a head of a person;
holding both hands behind a back of the person;
crouching; or
lying down.

17. The computing device of claim 15, wherein processing the frame to create the processed frame comprises:
adjusting a frame size of the frame;
adjusting a sharpness of the frame;
adjusting a zoom of the frame;
adjusting a brightness of the frame;
adjusting a contrast of the frame;
adjusting a color saturation of the frame;
adjusting one or more colors of the frame;
converting the one or more colors of the frame to a grayscale;
converting the frame into two or more portions of the frame; or
any combination thereof.

18. The computing device of claim 15, wherein the facial expression indicates:
fear,
surprise,
anger,
aggression
or
any combination thereof.

19. The computing device of claim 15, wherein the details associated with individual threats include:
a locus comprising one of a person or the object;
a threat type;
a threat level determined based at least in part on the facial expression of the person, a threatening gesture, or the weapon in the processed frame;
a length of time that individual threats have been detected;
a consecutive number of frames that individual threats have been detected;
a probability associated with the threat type; or
any combination thereof.

20. The computing device of claim 15, wherein:
the artificial intelligence module uses a deep learning neural network; and
the designated recipient comprises:
an owner or a manager of a business that includes a security system outputting one or more video streams that include a frame used to create the processed frame;
a security company monitoring the security system;
a law enforcement agency; or
any combination thereof.

* * * * *